(12) United States Patent
Chang

(10) Patent No.: US 10,930,016 B2
(45) Date of Patent: Feb. 23, 2021

(54) IMAGE SYNTHESIZING METHOD

(71) Applicant: Wistron Corporation, New Taipei (TW)

(72) Inventor: Yao-Tsung Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 136 days.

(21) Appl. No.: 16/373,127

(22) Filed: Apr. 2, 2019

(65) Prior Publication Data

US 2020/0167962 A1    May 28, 2020

(30) Foreign Application Priority Data

Nov. 26, 2018  (TW) .............................. 107142112 A

(51) Int. Cl.
| | | |
|---|---|---|
| *G06T 5/50* | (2006.01) | |
| *G06T 5/20* | (2006.01) | |
| *G06T 15/00* | (2011.01) | |
| *G06T 7/90* | (2017.01) | |
| *G06K 9/62* | (2006.01) | |

(Continued)

(52) U.S. Cl.
CPC .............. *G06T 7/90* (2017.01); *G06K 9/6215* (2013.01); *G06T 5/002* (2013.01); *G06T 5/20* (2013.01); *G06T 7/97* (2017.01); *G06T 2207/10024* (2013.01)

(58) Field of Classification Search
CPC . G06T 5/002; G06T 5/20; G06T 2207/10024; G06T 2207/10004; G06T 5/50
See application file for complete search history.

(56) References Cited

U.S. PATENT DOCUMENTS

| | | | | |
|---|---|---|---|---|
| 6,148,113 | A  * | 11/2000 | Wolverton | .............. G06T 5/002 |
| | | | | 382/254 |
| 10,217,195 | B1 * | 2/2019 | Agrawal | ................... G06T 7/11 |
| 2012/0307009 | A1 * | 12/2012 | Li | ...................... H04N 5/23229 |
| | | | | 348/46 |

FOREIGN PATENT DOCUMENTS

| | | |
|---|---|---|
| TW | 201607313 A | 2/2016 |
| TW | 201636951 A | 10/2016 |

OTHER PUBLICATIONS

Office Action dated Nov. 28, 2019 in corresponding Taiwan Patent Application No. 107142112.

* cited by examiner

*Primary Examiner* — Brian Werner
(74) *Attorney, Agent, or Firm* — Stout, Uxa & Buyan, LLP; Donald E. Stout

(57) ABSTRACT

An image synthesizing method includes capturing a first image using a reference small aperture size; capturing a second image using a reference large aperture size; obtaining one or more reference color weights according to a corresponding pixel of the first image and adjacent pixels of the corresponding pixel of the first image and a corresponding pixel of the second image; obtaining an associated distance by looking up an association table according to the one or more reference color weights; obtaining one or more associated color weights by looking up the association table according to the associated distance and an expected aperture; and obtaining a color value of a corresponding pixel of a synthesized image, by applying weighting to the corresponding pixel of the first image and the adjacent pixels of the corresponding pixel of the first image with the one or more associated color weights.

14 Claims, 13 Drawing Sheets

(51) Int. Cl.
*G06T 7/00* (2017.01)
*G06T 5/00* (2006.01)

PA

PB

PC

PD

| | | | | |
|---|---|---|---|---|
| | $p_{i-1,j+1}$ | $p_{i,j+1}$ | $p_{i+1,j+1}$ | |
| | $p_{i-1,j}$ | $p_{i,j}$ | $p_{i+1,j}$ | |
| | $p_{i-1,j-1}$ | $p_{i,j-1}$ | $p_{i+1,j-1}$ | |
| | | | | |

*FIG. 4E*

| f-number | | color weight | distance Z1 (focal point) | distance Z2 | distance Z3 | distance Z4 |
|---|---|---|---|---|---|---|
| basis small aperture A | 11 | N3 | $N3_{AZ1}$ | $N3_{AZ2}$ | $N3_{AZ3}$ | $N3_{AZ4}$ |
| | | N2 | $N2_{AZ1}$ | $N2_{AZ2}$ | $N2_{AZ3}$ | $N2_{AZ4}$ |
| | | N1 | $N1_{AZ1}$ | $N1_{AZ2}$ | $N1_{AZ3}$ | $N1_{AZ4}$ |
| basis large aperture L | 4 | N3 | $N3_{LZ1}$ | $N3_{LZ2}$ | $N3_{LZ3}$ | $N3_{LZ4}$ |
| | | N2 | $N2_{LZ1}$ | $N2_{LZ2}$ | $N2_{LZ3}$ | $N2_{LZ4}$ |
| | | N1 | $N1_{LZ1}$ | $N1_{LZ2}$ | $N1_{LZ3}$ | $N1_{LZ4}$ |
| aperture B | 8 | N3 | $N3_{BZ1}$ | $N3_{BZ2}$ | $N3_{BZ3}$ | $N3_{BZ4}$ |
| | | N2 | $N2_{BZ1}$ | $N2_{BZ2}$ | $N2_{BZ3}$ | $N2_{BZ4}$ |
| | | N1 | $N1_{BZ1}$ | $N1_{BZ2}$ | $N1_{BZ3}$ | $N1_{BZ4}$ |
| aperture C | 5.6 | N3 | $N3_{CZ1}$ | $N3_{CZ2}$ | $N3_{CZ3}$ | $N3_{CZ4}$ |
| | | N2 | $N2_{CZ1}$ | $N2_{CZ2}$ | $N2_{CZ3}$ | $N2_{CZ4}$ |
| | | N1 | $N1_{CZ1}$ | $N1_{CZ2}$ | $N1_{CZ3}$ | $N1_{CZ4}$ |
| aperture D | 4 | N3 | $N3_{DZ1}$ | $N3_{DZ2}$ | $N3_{DZ3}$ | $N3_{DZ4}$ |
| | | N2 | $N2_{DZ1}$ | $N2_{DZ2}$ | $N2_{DZ3}$ | $N2_{DZ4}$ |
| | | N1 | $N1_{DZ1}$ | $N1_{DZ2}$ | $N1_{DZ3}$ | $N1_{DZ4}$ |
| aperture E | 2.8 | N3 | $N3_{EZ1}$ | $N3_{EZ2}$ | $N3_{EZ3}$ | $N3_{EZ4}$ |
| | | N2 | $N2_{EZ1}$ | $N2_{EZ2}$ | $N2_{EZ3}$ | $N2_{EZ4}$ |
| | | N1 | $N1_{EZ1}$ | $N1_{EZ2}$ | $N1_{EZ3}$ | $N1_{EZ4}$ |
| aperture F | 2 | N3 | $N3_{FZ1}$ | $N3_{FZ2}$ | $N3_{FZ3}$ | $N3_{FZ4}$ |
| | | N2 | $N2_{FZ1}$ | $N2_{FZ2}$ | $N2_{FZ3}$ | $N2_{FZ4}$ |
| | | N1 | $N1_{FZ1}$ | $N1_{FZ2}$ | $N1_{FZ3}$ | $N1_{FZ4}$ |

IMAGE SYNTHESIZING METHOD

CROSS-REFERENCE TO RELATED APPLICATIONS

This application claims priority of Taiwan Patent Application No. 107142112, filed on Nov. 26, 2018, the entire contents of which are hereby incorporated by reference.

BACKGROUND OF THE INVENTION

1. Field of the Invention

The present invention generally relates to image processing, and more particularly to an image synthesizing system and method.

2. Description of Related Art

The depth of field (DOF) is the distance range where objects appear sharp in an image when it is captured by a camera, and the objects out of this range become blurred. The DOF may be determined by adjusting the aperture. N (f-number)=f (focal length)/D (aperture diameter) or D=f/N, where the f-number N indicates the size of the aperture, and is the reciprocal of the relative aperture, may commonly be 1, 1.4, 2, 2.8, 4, 5.6, 8, 11, etc. The DOF may be increased by reducing the aperture size (or increasing the f-number). Alternatively, the DOF may be decreased by increasing the aperture size (or decreasing the f-number). For example, the aperture size corresponding to the f-number 4 is smaller than the aperture size corresponding to the f-number 2, but the former has a DOF deeper (larger) than the latter.

A small aperture size is commonly used to obtain large DOF when capturing distant scenes. On the contrary, a large aperture size is commonly used to obtain small DOF when capturing near objects. A user needs to adjust the aperture constantly to achieve an expected effect, therefore causing the user inconvenience. Shallow DOF effect may be made through post-production by using software, but is commonly not real enough.

A need has thus arisen to propose a novel mechanism to overcome drawbacks in conventional image capturing.

SUMMARY OF THE INVENTION

In view of the foregoing, it is an object of the embodiments of the present invention to provide an image synthesizing method for realizing different depths of field.

According to one embodiment, an image synthesizing method includes providing an association table; capturing a first image using a reference small aperture size; capturing a second image using a reference large aperture size; obtaining one or more reference color weights according to a corresponding pixel of the first image and adjacent pixels of the corresponding pixel of the first image and a corresponding pixel of the second image; obtaining an associated distance by looking up the association table according to the one or more reference color weights; obtaining one or more associated color weights by looking up the association table according to the associated distance and an expected aperture; and obtaining a color value of a corresponding pixel of a synthesized image, by applying weighting to the corresponding pixel of the first image and the adjacent pixels of the corresponding pixel of the first image with the one or more associated color weights.

According to another embodiment, an image synthesizing method includes capturing a first image using a first aperture; capturing a second image using a second aperture that is larger than the first aperture in size; obtaining a color difference between corresponding pixels according to the first image and the second image; obtaining a color weight of adjacent pixels of the first image according to the color difference and adjacent pixels of the first image; and providing a relation between the color weight of adjacent pixels and a depth value, and obtaining the depth value according to the color weight of adjacent pixels and based on the relation between the color weight of adjacent pixels and the depth value.

BRIEF DESCRIPTION OF THE DRAWINGS

FIG. 4E exemplifies a pixel and adjacent pixels;

FIG. 5 shows an exemplary association table regarding distance, aperture and color weight constructed according to the image synthesizing method of the embodiment of the present invention;

FIG. 8 exemplifies a corresponding pixel of the first image and a corresponding pixel of the second image;

DETAILED DESCRIPTION OF THE INVENTION

The embodiments of the present invention use an image processing technique to generate a synthesized image with an expected aperture by combining two images with different apertures and DOFs. According to one embodiment of the present invention, firstly, a scene is shot twice with different apertures (DOFs) in sequence or simultaneously; secondly, two images with different DOFs are captured, that is, one image with small aperture size (large DOF) and another image with large aperture size (small DOF); thirdly, the color difference of two corresponding pixels in the two images is obtained, where a small color difference indicates that the object in the scene associated with a pixel is within the DOF and the pixel is near the in-focus point position, and thus the image is least affected by adjacent pixels even with large aperture, while a large color difference indicates that the object in the scene associated with a pixel is out of the DOF and the pixel is far away from the in-focus point position, and thus the image is substantially affected by adjacent pixels with large aperture. When a pixel is distinct in color from adjacent pixels with large difference, it may result in large color difference with respect to the adjacent pixels; and when a pixel is distinct in color from adjacent pixels with small difference, it may result in small color difference with respect to the adjacent pixels. The degree of influence of adjacent pixels on a pixel may be obtained according to the color difference of the pixel with the adjacent pixels and the color information of the adjacent pixels. Accordingly, image processing may be performed on the pixel to achieve different aperture (DOF) effect, and the device and method of carrying out the embodiments will be described in the following paragraphs.

Figure 1:
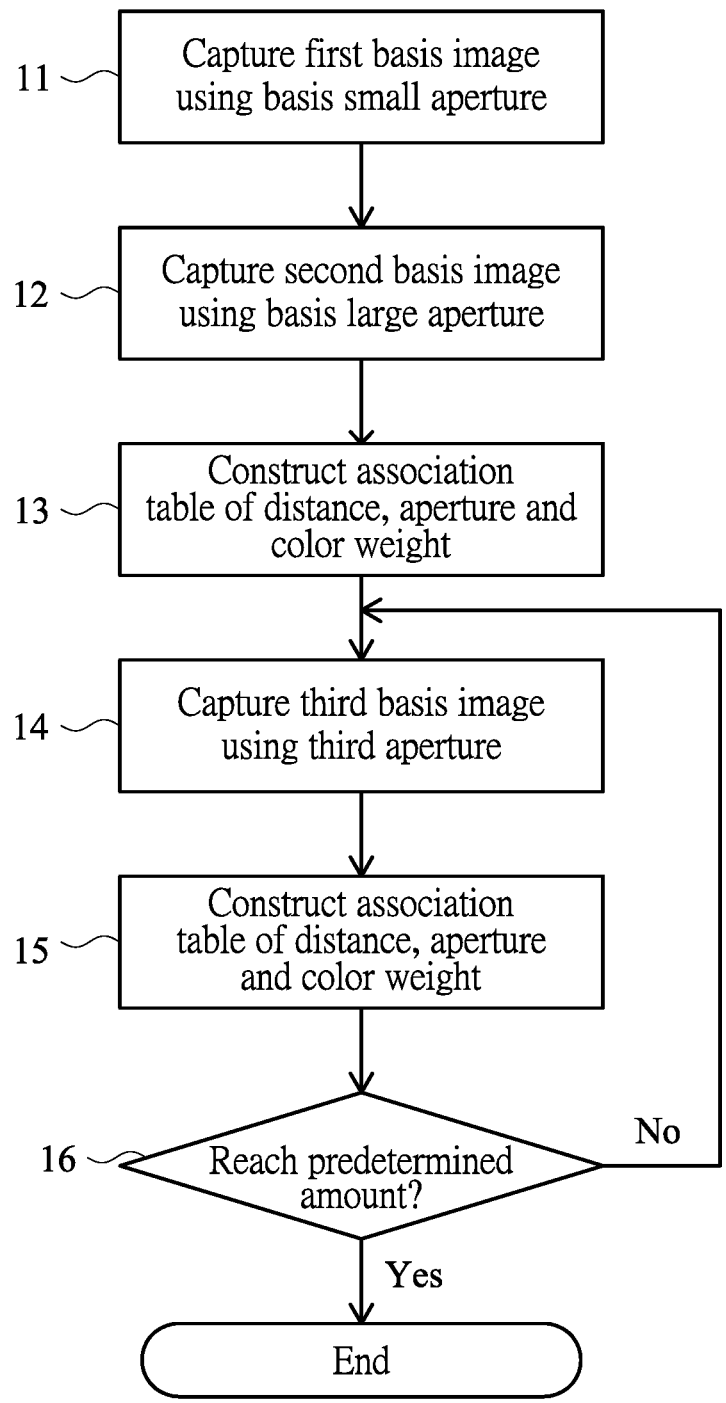
FIG. 1 shows a flow diagram illustrating an image synthesizing method according to a first embodiment of the present invention.
Figure 2A:
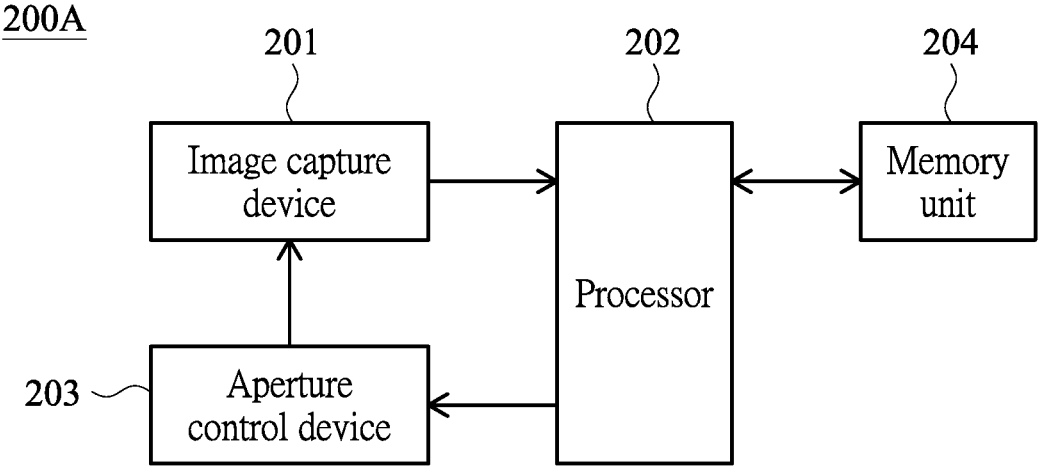
FIG. 2A shows a system block diagram illustrating a single-lens imaging system according to one embodiment of the present invention.

FIG. 1 shows a flow diagram illustrating an image synthesizing method 100 according to a first embodiment of the present invention adaptable to constructing an association table. The image synthesizing method 100 of the embodiment may be executed by a single-lens imaging system 200A or a dual-lens imaging system 200B. FIG. 2A shows a system block diagram illustrating the single-lens imaging system 200A according to one embodiment of the present invention, and FIG. 2B shows a system block diagram illustrating the dual-lens imaging system 200B according to another embodiment of the present invention.

As shown in FIG. 2A, the single-lens imaging system 200A may include an image capture device 201, a processor 202, an aperture control device 203 and a memory unit 204. The image capture device 201 may include a two-dimensional (2D) camera with a variable aperture for capturing a 2D image. In one example, the image capture device 201 may be disposed in a mobile device (e.g., mobile phone). The image capture device 201 may also include a shutter, a flash and/or exposure compensation mechanism, in order for capturing a sharp image. The processor 202 may execute a control program to adjust a size of the aperture of the image capture device 201 through the aperture control device 203. Moreover, the processor 202 may receive images captured by the image capture device 201, and then perform an image processing on the received images. The memory unit 204, such as dynamic random-access memory (DRAM) or static random-access memory (SRAM), may store images captured by the image capture device 201, control programs executable by the processor 202 and images processed by the processor 202.

Figure 2B:
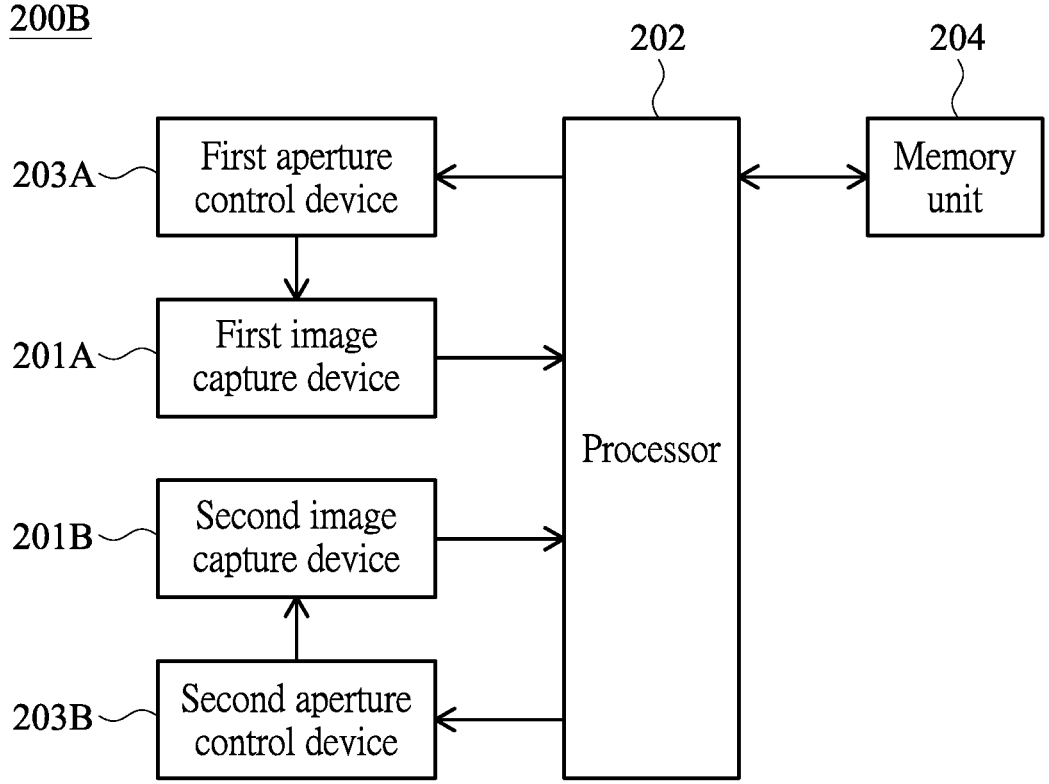
FIG. 2B shows a system block diagram illustrating a dual-lens imaging system according to another embodiment of the present invention.

As shown in FIG. 2B, the dual-lens imaging system 200B may include a first image capture device 201A, a second image capture device 201B, a processor 202, a first aperture control device 203A, a second aperture control device 203B and a memory unit 204. The first image capture device 201A may include a 2D camera for capturing a 2D image. Similarly, the second image capture device 201B may include a 2D camera for capturing a 2D image. In one example, the first image capture device 201A and the second image capture device 201B may be disposed in a mobile device (e.g., mobile phone). The first image capture device 201A and/or the second image capture device 201B may also include a shutter, a flash and/or exposure compensation mechanism for capturing a sharp image. The processor 202 may execute a control program to adjust a size of the aperture of the first image capture device 201A and a size of the aperture of the second image capture device 201B through the first aperture control device 203A and the second aperture control device 203B, respectively. Moreover, the processor 202 may receive images captured by the first image capture device 201A and the second image capture device 201B, and then perform an image processing on the received images. The memory unit 204, such as dynamic random-access memory (DRAM) or static random-access memory (SRAM), may store images captured by the first image capture device 201A and the second image capture device 201B, control programs executable by the processor 202 and images processed by the processor 202. In one example, the first image capture device 201A may have a fixed first aperture, and the second image capture device 201B may have a fixed second aperture which is different from the first aperture. Accordingly, the dual-lens imaging system 200B may omit the first aperture control device 203A and the second aperture control device 203B.

For the image synthesizing method 100 shown in FIG. 1, steps 11 through 16 are included. In step 11, a first basis image is captured by using a basis small aperture (e.g., f-number 11), and, in step 12, a second basis image is captured by using a basis large aperture (e.g., f-number 4), where the basis small aperture is smaller than the basis large aperture in size. In one embodiment, the single-lens imaging system 200A of FIG. 2A may be used to execute step 11 and step 12 in sequence, not necessarily in the sequence shown in FIG. 1. In another embodiment, the dual-lens imaging system 200B of FIG. 2B may be used to execute step 11 and step 12 simultaneously.

Next, in step 13, an association table of distance, aperture and color weight is constructed according to a plurality of pixel positions of the first basis image and the second basis image. In the embodiment, a color difference at a same pixel position between the first basis image and the second basis image is used to represent a distance between an object and a focal point position. A small color difference indicates that the associated object is near the focal point position (i.e., near distance), while a large color difference indicates that the associated object is far away from the focal point position (i.e., far distance).

Figure 3A:
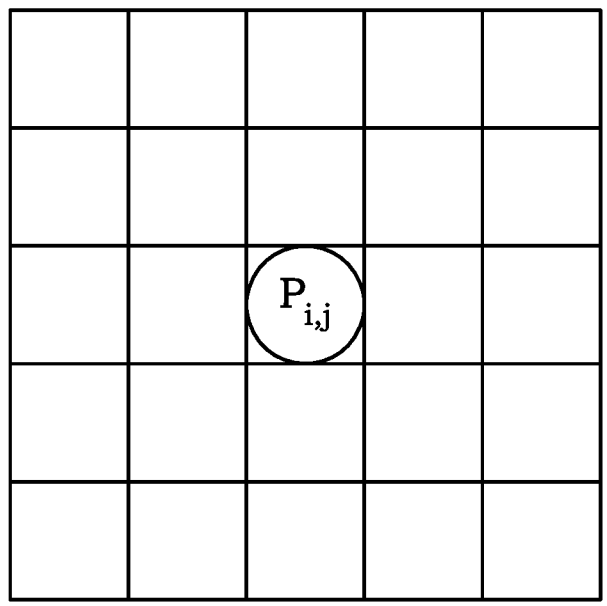
FIG. 3A and FIG. 3B show different imaging ranges for different distances, respectively.
Figure 3B:
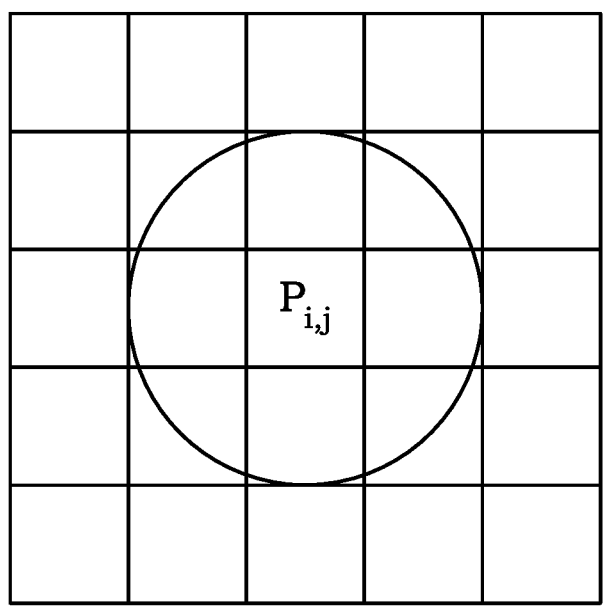
Figure 10:
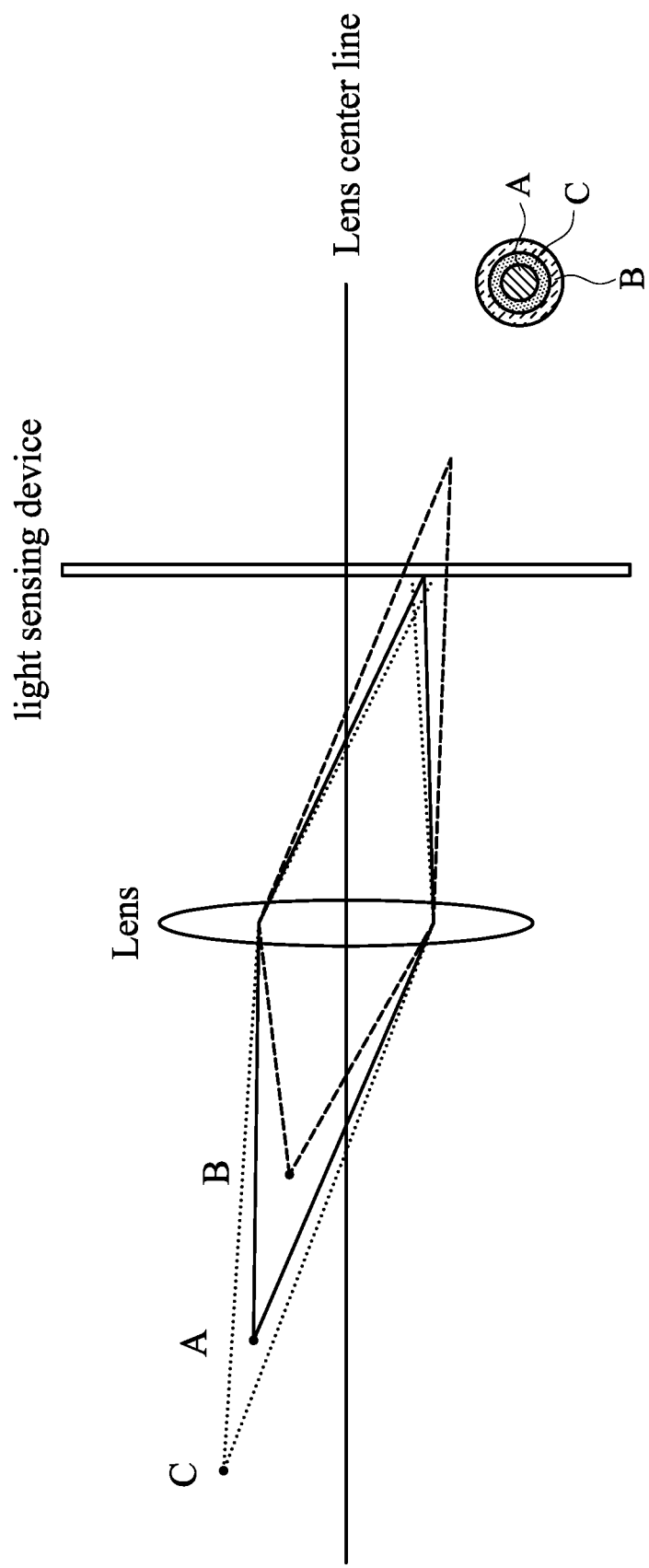
FIG. 10 schematically shows imaging of a camera illustrating effect of relative position of an object to the focal point position on the imaging.
Figure 11:
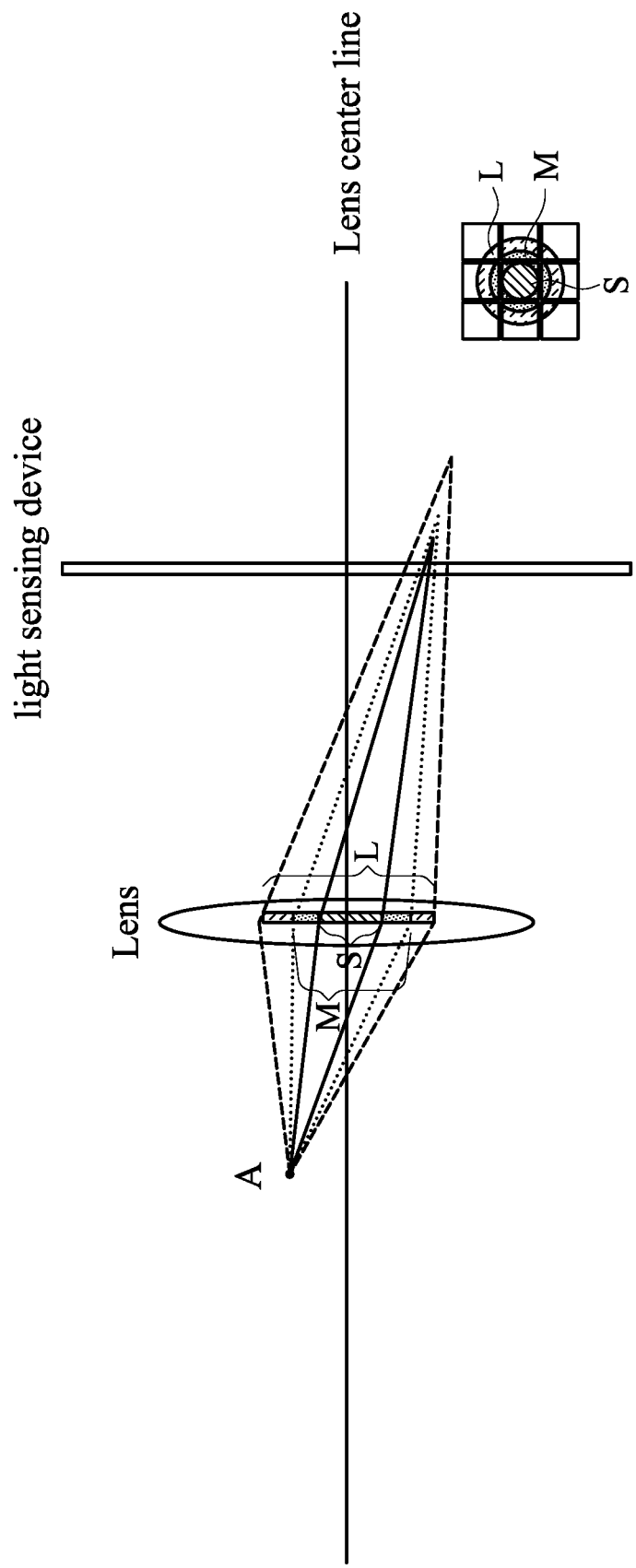
FIG. 11 schematically shows imaging of a camera illustrating effect of aperture size on the imaging.
Figure 12:
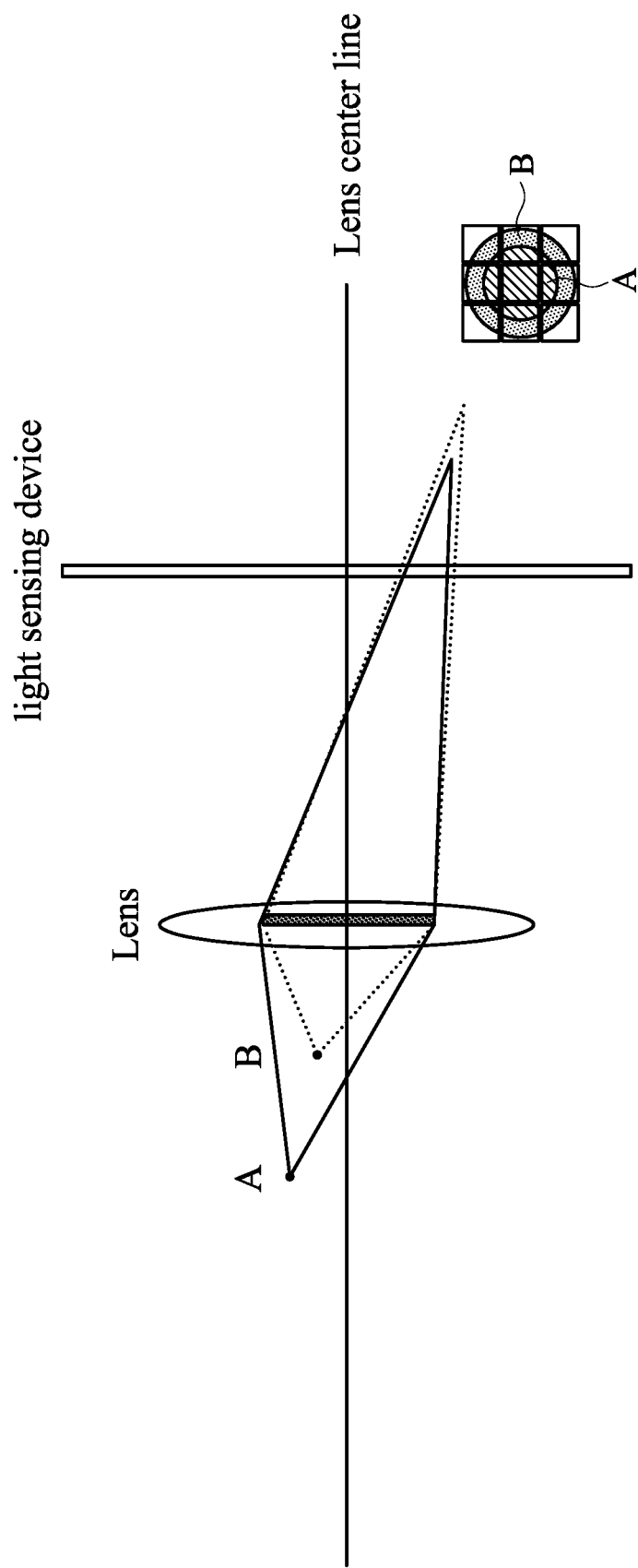
FIG. 12 schematically shows imaging of a camera illustrating effect of the position of an object with the same aperture size on the imaging.

FIG. 10 through FIG. 12 demonstrate basic imaging principle of a camera. According to FIG. 10 through FIG. 12, as will be elucidated later in the specification, an imaging range may cover only one pixel when an object is located at the focal point position, while the imaging range may cover more than one pixel when the object is located away from the focal point position. When the distance (from the focal point position) is farther, more adjacent pixels may be covered by the imaging range. FIG. 3A shows an example in which the imaging range covers only one pixel $P_{i,j}$ (wherein i and j represent coordinates of the pixel) to result in a sharp image, namely the first basis image, when the object is near the focal point position with a near distance. FIG. 3B shows an example in which the imaging range further covers adjacent pixels of the pixel $P_{i,j}$ to result in a blurred image, namely the second basis image, when the object is far away from the focal point position with a far distance.

Assume two images P1 and P2 represent the first basis image and the second basis image respectively, and $P1_{i,j}$ and $P2_{i,j}$ represent corresponding pixels of the images P1 and P2 respectively. A color difference between $P1_{i,j}$ and $P2_{i,j}$ may be defined in various ways. In one embodiment, a color difference $\Delta(P1_{i,j}, P2_{i,j})$ between the pixel $P1_{i,j}$ of the first basis image and the corresponding pixel $P2_{i,j}$ of the second basis image may be expressed as:

$$\Delta(P1_{i,j}, P2_{i,j}) = \sqrt{\left(R1_{i,j} - \frac{R2_{i,j}}{N}\right)^2 + \left(G1_{i,j} - \frac{G2_{i,j}}{N}\right)^2 + \left(B1_{i,j} - \frac{B2_{i,j}}{N}\right)^2}$$

where $R1_{i,j}$, $G1_{i,j}$ and $B1_{i,j}$ respectively represent red value, green value and blue value of the pixel $P1_{i,j}$ of the first basis image, $R2_{i,j}$, $G2_{i,j}$ and $B2_{i,j}$ respectively represent red value, green value and blue value of the pixel $P2_{i,j}$ of the second basis image, and N represents a compensation value.

In one embodiment adopting an aperture-fixed mode, shutter speeds and ISO sensitivity (film speed) corresponding to the first basis image and the second basis image are the same. The compensation value N in the aperture-fixed mode may be defined as an incident-light amount ratio of the basis large aperture to the basis small aperture. Alternatively speaking, the compensation value N may be defined as an aperture-area ratio of the second basis image to the first basis image, i.e., N=(aperture area of the second basis image/aperture area of the first basis image). In another embodiment adopting an aperture priority mode, shutter speeds and ISO sensitivity corresponding to the first basis image and the second basis image are accordingly adjusted. The compensation value N in the aperture priority mode may be set at 1, that is, no compensation has to be done.

In one embodiment, the compensation value N may be defined as a ratio of average brightness LP2 of the second basis image to average brightness LP1 of the first basis image, i.e., N=LP2/LP1, where LP2 and LP1 may be expressed as:

$$LP2 = \sqrt{R2_{ave}^2 + G2_{ave}^2 + B2_{ave}^2}$$
$$LP1 = \sqrt{R1_{ave}^2 + G1_{ave}^2 + B1_{ave}^2}$$

where $R1_{ave}$, $G1_{ave}$, $B1_{ave}$, $R2_{ave}$, $G2_{ave}$ and $B2_{ave}$ respectively represent average brightness values of primary colors C, which may be expressed as:

$$C_{ave} = \frac{\sum_{k=1}^{n} C_k}{n}$$

where $C_k = R_k$, $G1_k$, $B1_k$, $R2_k$, $G2_k$ or $B2_k$, and n represents the number of pixels of the basis image.

In another embodiment, a color difference ratio, instead of color difference, at a same pixel position between the first basis image and the second basis image is used to represent a distance. The color difference ratio may be defined as a ratio of the color difference $\Delta(P1_{i,j}, P2_{i,j})$ (between the pixel $P1_{i,j}$ of the first basis image and the corresponding pixel $P2_{i,j}$ of the second basis image) to the brightness $LP1_{i,j}$ of the pixel $P1_{i,j}$ of the first basis image, i.e., color difference ratio=$\Delta(P1_{i,j},P2_{i,j})/(LP1_{i,j})$, where $LP1_{i,j}$ is a square root of a sum of squares for $R1_{i,j}$, $G1_{i,j}$ and $B1_{i,j}$, and may be expressed as:

$$LP1_{i,j} = \sqrt{(R1_{i,j})^2 + (G1_{i,j})^2 + (B1_{i,j})^2}$$

In a further embodiment, a color difference ratio may be defined as a square root of a sum of squares for color difference ratios of individual colors R, G and B as follows:

$$\text{color difference ratio} = \sqrt{\left(1 - \frac{R2_{i,j}}{NR1_{i,j}}\right)^2 + \left(1 - \frac{G2_{i,j}}{NG1_{i,j}}\right)^2 + \left(1 - \frac{B2_{i,j}}{NB1_{i,j}}\right)^2}$$

In a further embodiment, color differences of primary colors are individually considered as follows (where N represents a compensation value defined as an aperture-area ratio, and N may be set at 1 when not considering brightness difference caused by aperture):

color difference of $R_{i,j} = R1_{i,j} - R2_{i,j}/N$
color difference of $G_{i,j} = G1_{i,j} - G2_{i,j}/N$
color difference of $B_{i,j} = B1_{i,j} - B2_{i,j}/N$ As the difference in color may be caused by aperture, distance from the in-focus point position and color of adjacent pixels, color weights of adjacent pixels should be obtained in order to generate an image with an expected aperture.

Large color difference indicates that the pixel is substantially affected by adjacent pixels, which also means that, the color of the pixel has large weighting affecting the adjacent pixels. The following conclusions may accordingly be obtained: (1) the larger the aperture size is, the stronger the effect of adjacent pixels on the pixel is, and the larger the color difference and/or color difference ratio is; (2) the farther a pixel is away from the in-focus point position, the stronger the effect of the adjacent pixels on a pixel is, and the larger the color difference and/or color difference ratio is; and (3) the larger the difference in color of a pixel from adjacent pixels is, the larger the color difference and/or color difference ratio is.

Moreover, the smaller the f-number is (or the larger the aperture diameter is), the stronger the effect of adjacent pixels on the pixel is. On the contrary, the larger the f-number is (or the smaller the aperture diameter is), the weaker the effect of adjacent pixels on the pixel is.

As a pixel at (i,j) is near the in-focus point position, corresponding light will focus on the pixel but not affect adjacent pixels, which also means that, the adjacent pixels will not affect the pixel. Moreover, each pixel is not affected by adjacent pixels with small aperture, that is, Pij=pij*1, where Pij represents color information of the pixel at (i,j), and pij represents color information of the pixel at (i,j) with small aperture.

On the contrary, each pixel is substantially affected by adjacent pixels with large aperture, and Pij may be one of the following situations depending on how the pixel is away from the in-focus point position. FIG. 4A through FIG. 4D respectively exemplify how pixel Pij that is away from the in-focus point position affects adjacent pixels with large aperture.

Figure 4A:
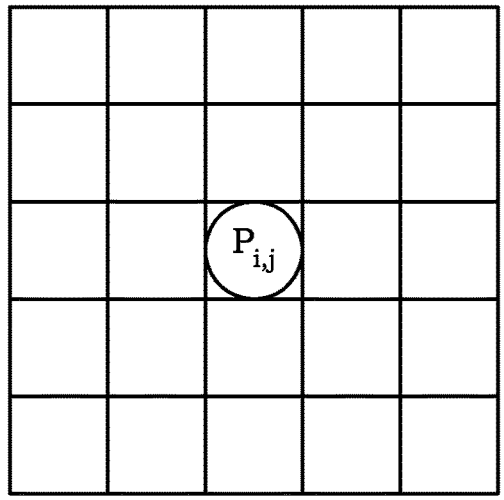
FIG. 4A through FIG. 4D respectively exemplify how pixel Pij that is away from the in-focus point position affects adjacent pixels with large aperture.

FIG. 4A shows an image PA, in which the pixel Pij is near the in-focus point position. The pixel does not affect adjacent pixels, and is not affected by adjacent pixels as well. That is, Pij=pij*N, where N represents brightness ratio of large aperture to small aperture.

Figure 4B:
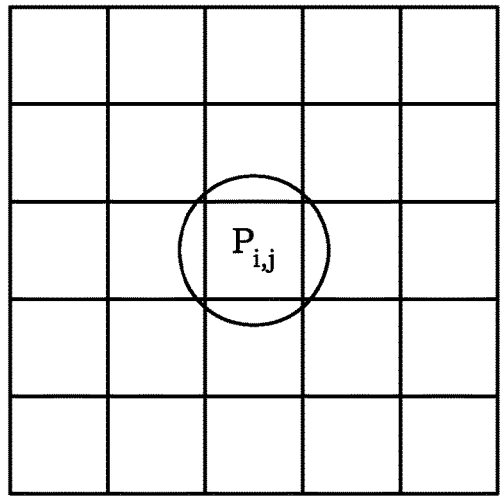

FIG. 4B shows an image PB, in which the pixel Pij is somewhat away from the in-focus point position. The pixel somewhat affects adjacent pixels, and is also somewhat affected by adjacent pixels. For example, Pij=(pi−1,j+pi+1, j+pi,j−1+pi,j+1)*0.1N+pij*0.6N, where 0.1N and 0.6N are exemplary weights depending on how far the pixel is away from the in-focus point position, and may be determined experimentally. It is noted that the sum of weights of the pixels with small aperture=(4)*0.1N+(1)*0.6N=100% N=N, which equals to the brightness ratio of large aperture to small aperture. In other words, a sum of weights is equal to 1 when the effect of the brightness ratio of large aperture to small aperture is omitted, or when the incident-light amounts thereof are the same.

Figure 4C:
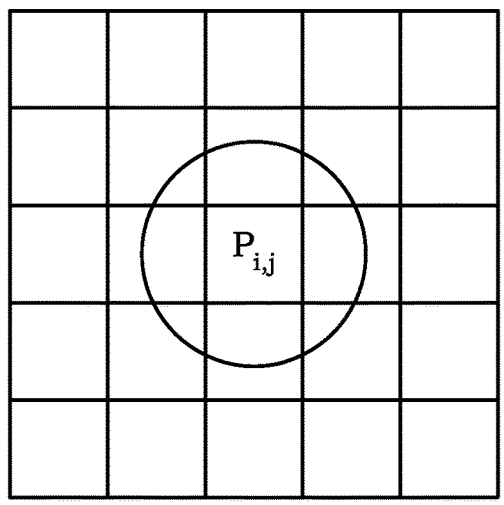

FIG. 4C shows an image PC, in which the pixel Pij is more away from the in-focus point position. The pixel more affects adjacent pixels, and is also more affected by adjacent pixels. For example, Pij=(pi−1,j+pi+1,j+pi,j−1+pi,j+1)*0.13N+(pi−1,j−1+pi−1,j+1+pi+1,j−1+pi+1,j+1)*0.05N+pij*0.28N, where 0.13N, 0.05N and 0.28N are exemplary weights depending on how far the pixel is away from the in-focus point position, and may be determined experimentally. It is noted that the sum of weights of the pixels with small aperture=(4)*0.13N+(4)*0.05N+(1)*0.28N=100% N=N, which equals to the brightness ratio of large aperture to small aperture. In other words, a sum of weights is equal to 1 when the effect of the brightness ratio of large aperture to small aperture is omitted, or when the incident-light amounts thereof are the same.

Figure 4D:
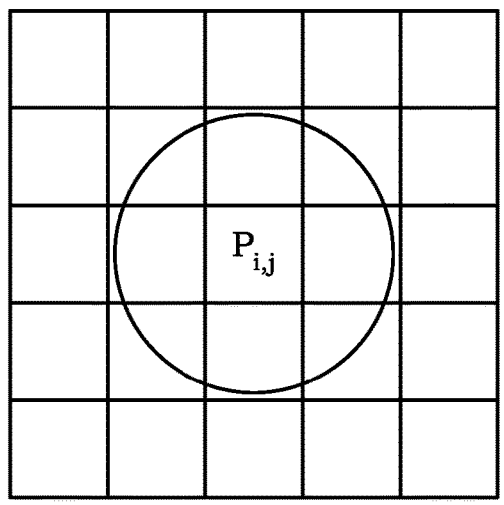

FIG. 4D shows an image PD, in which the pixel Pij is even more away from the in-focus point position. The pixel even more affects adjacent pixels, and is also even more affected by adjacent pixels. For example, Pij=(pi−1,j+pi+1,j+pi,j−1+pi,j+1)*0.14N+(pi−1,j−1+pi−1,j+1+pi+1,j−1+pi+1,j+1)*0.06N+pij*0.20N, where 0.14N, 0.06N and 0.20N are exemplary weights depending on how far the pixel is away from the in-focus point position, and may be determined experimentally. It is noted that the sum of weights of the pixels with small aperture=(4)*0.14N+(4)*0.06N+(1)*0.20N=100% N=N, which equals to the brightness ratio of large aperture to small aperture. In other words, a sum of weights is equal to 1 when the effect of the brightness ratio of large aperture to small aperture is omitted, or when the incident-light amounts thereof are the same.

FIG. 4E exemplifies a pixel $p_{i,j}$ and adjacent pixels. According to the discussion mentioned above, in one embodiment, if $p_{i,j}$ represents a color value of a pixel (i,j) of the first basis image, a color value $P_{i,j}$ of a pixel (i,j) of the second basis image may be expressed as a weighted sum of the corresponding pixel (i,j) of the first basis image and adjacent pixels $p_{i-1,j}$, $p_{i+1,j}$, $p_{i,j-1}$, $p_{i,j+1}$, $p_{i-1,j-1}$, $p_{i-1,j+1}$, $p_{i+1,j-1}$, $p_{i+1,j+1}$ of the corresponding pixel (i,j) of the first basis image as follows:

$$P_{i,j}=p_{i,j}*N1+(p_{i-1,j}+p_{i+1,j}+p_{i,j-1}+p_{i,j+1})*N2+(p_{i-1,j-1}+p_{i-1,j+1}+p_{i+1,j-1}+p_{i+1,j+1})*N3 \quad (1)$$

where N1, N2 and N3 represent color weights. It is noted that the brightness ratio of large aperture to small aperture N1+N2+N3=100% N=N. In other words, a sum of weights is equal to 1 when the effect of the brightness ratio of large aperture to small aperture is omitted, or when the incident-light amounts thereof are the same.

The corresponding pixel color weight N1 is associated with the pixel $p_{i,j}$, the first adjacent pixel color weight N2 is associated respectively with left, right, bottom and top adjacent pixels $p_{i-1,j}$, $p_{i+1,j}$, $p_{i,j-1}$, $p_{i,j+1}$ of the pixel $p_{i,j}$, and the second adjacent pixel color weight N3 is associated respectively with bottom-left, top-left, bottom-right and top-right adjacent pixels $p_{i-1,j-1}$, $p_{i-1,j+1}$, $p_{i+1,j-1}$, $p_{i+1,j+1}$ of the pixel $p_{i,j}$. In another embodiment, only color weights N1 and N2 are considered (i.e., N3=0). In one embodiment of the present invention, adjacent pixels may include left, right, bottom and top adjacent pixels, while locations and amount of adjacent pixels are not limited to the example mentioned above. In another embodiment of the present invention, adjacent pixels may include bottom-left, top-left, bottom-right and top-right adjacent pixels, while locations and amount of adjacent pixels are not limited to the example mentioned above. In a further embodiment of the present invention, adjacent pixels may include various adjacent pixels not limited to the above embodiments but adjustable according to specific applications.

Take RGB color model as an example, color weights N1, N2 and N3 may be determined according to the color values of a pixel (i,j) and adjacent pixels of the first basis image, and the color values of a pixel (i,j) of the second basis image. Specifically, $P_{i,j}$ may be obtained from the second basis image, and the nine color values $p_{i,j}$, $p_{i-1,j}$, $p_{i+1,j}$, $p_{i,j-1}$, $p_{i,j+1}$, $p_{i-1,j-1}$, $p_{i-1,j+1}$, $p_{i+1,j-1}$, $p_{i+1,j+1}$ may be obtained from the first basis image, and the three values N1, N2 and N3 in the formula (1) need be solved. As each pixel has three colors R, G and B each having an associated equation, the three values N1, N2 and N3 can therefore be determined. In some situations, for example, the pixel has the same color as the environment, more than one solution may be obtained, and one solution may be arbitrarily chosen without substantially affecting the color in the synthesized image. In an alternative embodiment, the values N1, N2 and N3 may be solved by referring to N1, N2 and N3 above (below, to the left or to the right of) the pixel until the boundary of the image.

Table 1 exemplifies relation between color differences and color weights at different distances between a pixel P2 with a large aperture size (e.g., f/2) and a pixel P1 with a small aperture size (e.g., f/8). The color weights N1, N2 and N3 may be obtained experimentally, and the color difference ratios are designated as very small, small, small-middle, middle, middle-large and large respectively. Alternatively, the color weights N1, N2 and N3 may be determined based on design data.

TABLE 1

| Pixel location | in-focus point position | somewhat far | more far | even more far | far | very far |
|---|---|---|---|---|---|---|
| Color difference ratio | very small | small | small-middle | middle | middle-large | large |
| N1 | N | 0.6N | 0.56N | 0.28N | 0.24N | 0.20N |
| N2 | 0 | 0 | 0 | 0.05N | 0.05N | 0.06N |
| N3 | 0 | 0.1N | 0.11N | 0.13N | 0.14N | 0.14N |

Table 2 shows the contents of Table 1 in a different manner. Specifically, the color difference ratios are divided into a plurality of regions such as 0, 10%, 20%, 30%, 40% and 50%. In case that the associated color difference ratio is located between two values in the table, interpolation may be applied to obtain the corresponding N1, N2 and N3. For example, for the color weights associated with a color difference ratio of 15%, interpolation is applied on the color weights associated with the color difference ratio of 10% and the color weights associated with the color difference ratio of 20%, thereby resulting in N1=0.58N, N2=0, N3=0.105N.

TABLE 2

| Pixel location | in-focus point position | somewhat far | more far | even more far | far | very far |
|---|---|---|---|---|---|---|
| Color difference ratio | 0 | 10% | 20% | 30% | 40% | 50% |
| N1 | N | 0.6N | 0.56N | 0.28N | 0.24N | 0.20N |
| N2 | 0 | 0 | 0 | 0.05N | 0.05N | 0.06N |
| N3 | 0 | 0.1N | 0.11N | 0.13N | 0.14N | 0.14N |

After constructing the association table of distance, aperture and color weight of the first basis image and the second basis image, next in step 14, a third basis image is captured by using a third aperture that is different from the basis small aperture and the basis large aperture. In step 15, the association table of distance, aperture and color weight is constructed according to the plurality of pixel positions of the first basis image and the third basis image in a manner similar to step 13. Repeat step 14 but with different third aperture and step 15 to obtain plural different third basis images, and step 16 to test whether the predetermined amount has been reached or not, until predetermined amount has been reached, and then the flow ends. FIG. 5 shows an exemplary association table of distance, aperture and color weight constructed according to the image synthesizing method 100 of the embodiment of the present invention, where distance Z1 to distance Z4 are arranged from near to far, and aperture B to aperture F are arranged from small to large (in size).

Figure 6:
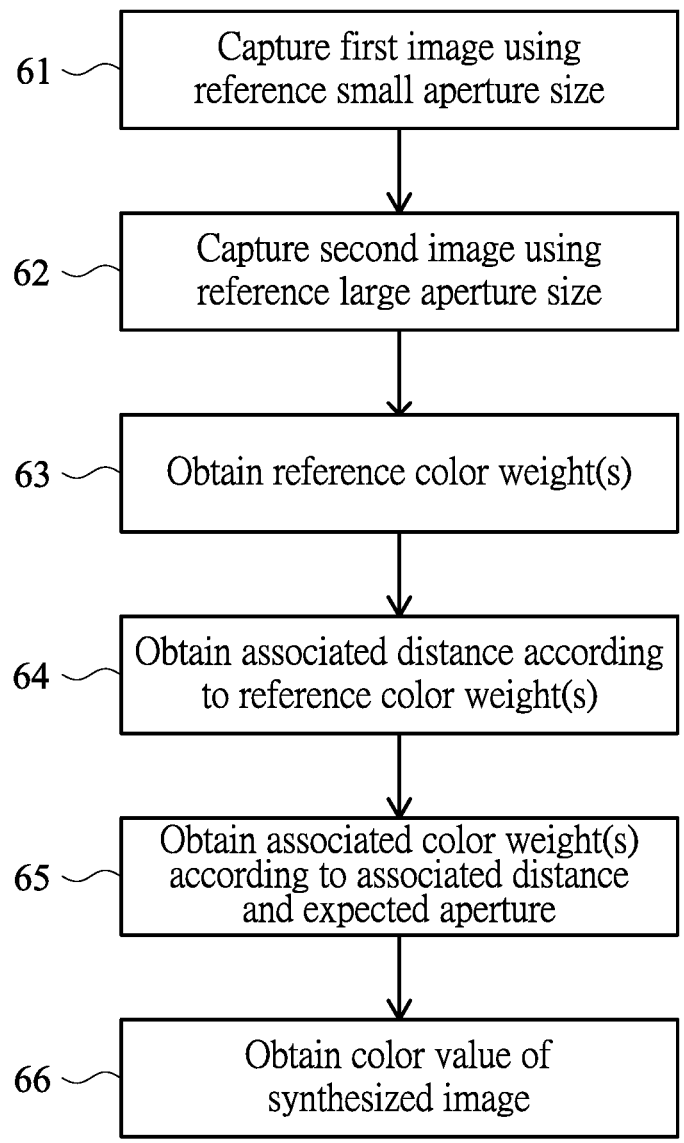
FIG. 6 shows a flow diagram illustrating an image synthesizing method according to a first embodiment of the present invention.

FIG. 6 shows a flow diagram illustrating an image synthesizing method 600 according to a first embodiment of the present invention adaptable to generating a synthesized image with an expected aperture. In step 61, a first image is captured by using a reference small aperture size (e.g., f-number 11). In step 62, a second image is captured by using a reference large aperture size (e.g., f-number 4). In one embodiment, the single-lens imaging system 200A of FIG. 2A may be used to execute step 61 and step 62 in sequence, not necessarily in the sequence shown in FIG. 6. In another embodiment, the dual-lens imaging system 200B of FIG. 2B may be used to execute step 61 and step 62 simultaneously.

In step 63, one or more reference color weights may be obtained according to a corresponding pixel of the first image and adjacent pixels of the corresponding pixel of the first image and a corresponding pixel of the second image by using the method (e.g., formula (1)) as discussed above. Next, in step 64, associated distance may be obtained by looking up the association table (constructed according to FIG. 1 and exemplified in FIG. 5) according to the one or more reference color weights (obtained in step 63).

In step 65, one or more associated color weights may be obtained by looking up the association table according to the associated distance (obtained in step 64) and an expected aperture. In case that the associated distance is located between two values in the association table, interpolation may be applied to obtain the one or more associated color weights. Finally, in step 66, a color value of a corresponding pixel of a synthesized image may be obtained by applying weighting to the corresponding pixel of the first image and adjacent pixels of the corresponding pixel of the first image with the one or more associated color weights (obtained in step 65) based on formula (1) mentioned above.

For example, an associated distance Z2 may be looked up in the association table according to reference color weights $N1_{LZ2}$, $N2_{LZ2}$ and $N3_{LZ2}$ corresponding to basis large aperture L (f/4). If the expected aperture is f/2.8, associated color weights $N1_{EZ2}$, $N2_{EZ2}$ and $N3_{EZ2}$ may be looked up in the association table of FIG. 5. Finally, color information of the expected aperture may be obtained according to the pixel, the adjacent pixels and the color weights $N1_{EZ2}$, $N2_{EZ2}$ and $N3_{EZ2}$. In one embodiment, if the expected aperture is larger than the maximum aperture in the association table, the expected aperture may be replaced with the maximum aperture F(f/2) in the association table. In another embodiment, if the color weights are larger than the maximum color weights in the association table, the distance may be replaced with the maximum distance Z4.

Figure 7:
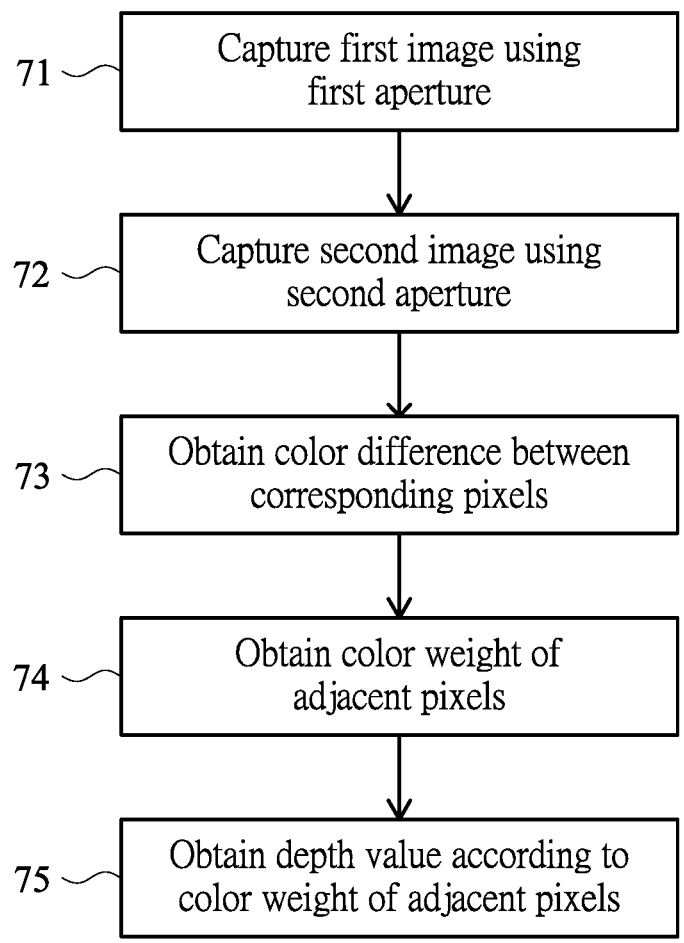
FIG. 7 shows a flow diagram illustrating an image synthesizing method according to a second embodiment of the present invention.

FIG. 7 shows a flow diagram illustrating an image synthesizing method 700 according to a second embodiment of the present invention. The single-lens imaging system 200A (FIG. 2A) or the dual-lens imaging system 200B (FIG. 2B) may be used to execute the image synthesizing method 700 of the embodiment.

Figure 8:
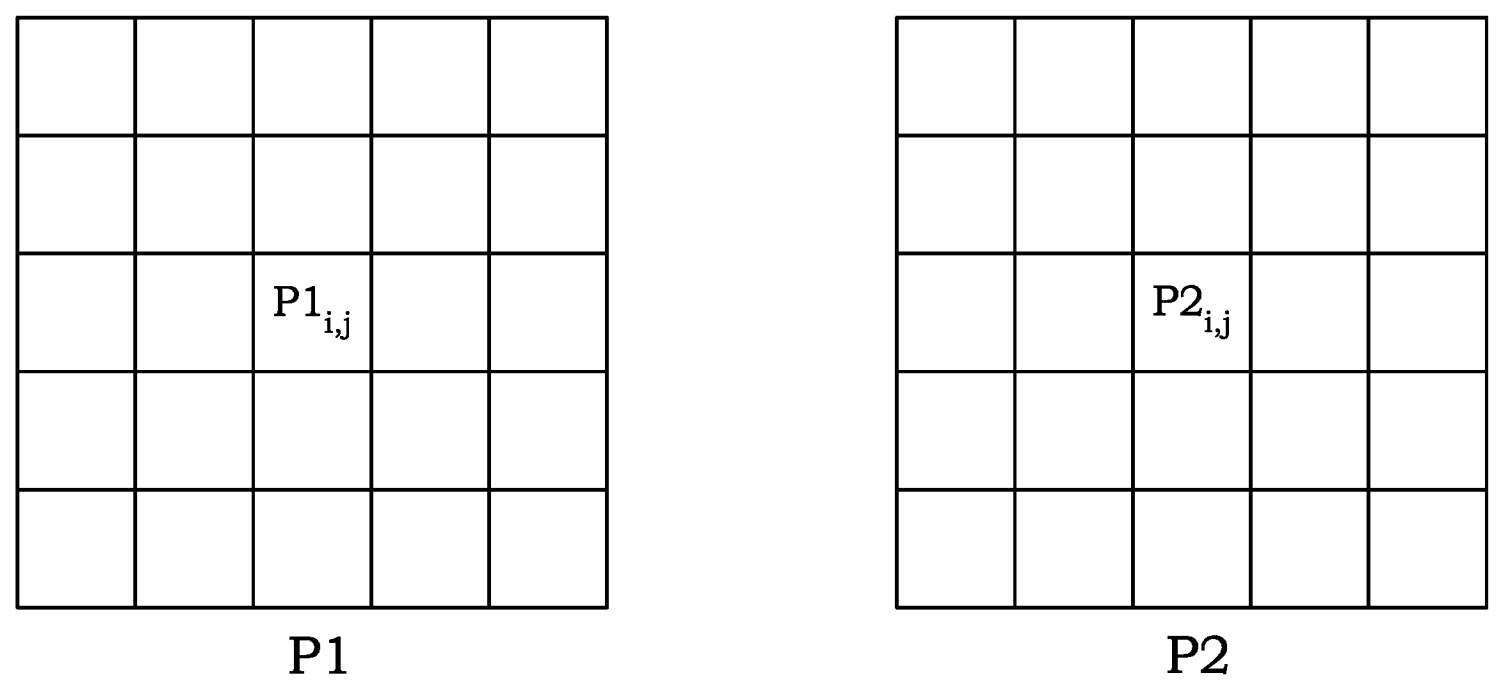

In step 71, a first image is captured by using a first aperture. In step 72, a second image is captured by using a second aperture. In one embodiment, the single-lens imaging system 200A of FIG. 2A may be used to execute step 71 and step 72 in sequence, not necessarily in the sequence shown in FIG. 7. In another embodiment, the dual-lens imaging system 200B of FIG. 2B may be used to execute step 71 and step 72 simultaneously. FIG. 8 exemplifies a corresponding pixel $P1_{i,j}$ of the first image P1 and a corresponding pixel $P2_{i,j}$ of the second image P2.

In step 73, a color difference $\Delta(P1_{i,j}, P2_{i,j})$ between corresponding pixels may be obtained according to the first image and the second image. The pixel $P2_{i,j}$ of the second image may be expressed as a weighted sum of the corresponding pixel $P1_{i,j}$ of the first image and adjacent pixels of the corresponding pixel $P1_{i,j}$ of the first image as follows:

$$P2_{i,j} = P1_{i,j} \times W1 + P1'_{i,j} \times W2 \quad (2)$$

where W1 represents color weight of corresponding pixel of the first image, W2 represents color weight of adjacent pixels of the corresponding pixel of the first image, $P1'_{i,j}$ represents an average color value of adjacent pixels of the pixel $P1_{i,j}$ and may be expressed as:

$$P1'_{i,j} = \text{Ave}(P1_{i-1,j}, P1_{i+1,j}, P1_{i,j-1}, P1_{i,j+1})$$

where Ave( ) represents an averaging function.

The color weight W1 of corresponding pixel in formula (2) is similar to the color weight N1 of corresponding pixel in formula (1), and the color weight W2 of adjacent pixels in formula (2) is similar to the color weight N2 of adjacent pixels in formula (1).

The color difference $\Delta(P1_{i,j}, P2_{i,j})$ may be expressed as $\Delta(P1_{i,j}, P2_{i,j}) = P2_{i,j} - P1_{i,j}$, into which formula (2) is substituted, thereby resulting in:

$$\Delta(P1_{i,j}, P2_{i,j}) = P1_{i,j} \times (W1-1) + P1'_{i,j} \times W2$$

In an aperture-fixed mode, shutter speeds and ISO sensitivity corresponding to the first image (step 71) and the second image (step 72) are the same. W1 may be set at 1, and the color difference may be expressed as:

$$\Delta(P_{i,j}, P2_{i,j}) = P1'_{i,j} \times W2 \quad (3A)$$

In an aperture priority mode, shutter speeds and ISO sensitivity corresponding to the first image (step 71) and the second image (step 72) are accordingly adjusted. The pixel $P2_{i,j}$ of the second image and the color difference may be expressed as:

$$P2_{i,j} = P1_{i,j} \times (1/N) + P1'_{i,j} \times (W2/N)$$

$$\Delta(P1_{i,j}, P2_{i,j}) = P1_{i,j} \times (1/N-1) + P1'_{i,j} \times (W2/N) \quad (3B)$$

where N represents a compensation value.

In step 74, color weight W2 of adjacent pixels of the first image may be obtained according to the color difference and the average of adjacent pixels of the first image (formula (3A)) or according to the color difference, the average color value of adjacent pixels and the color value of corresponding pixel of the first image (formula (3B)).

Figure 9:
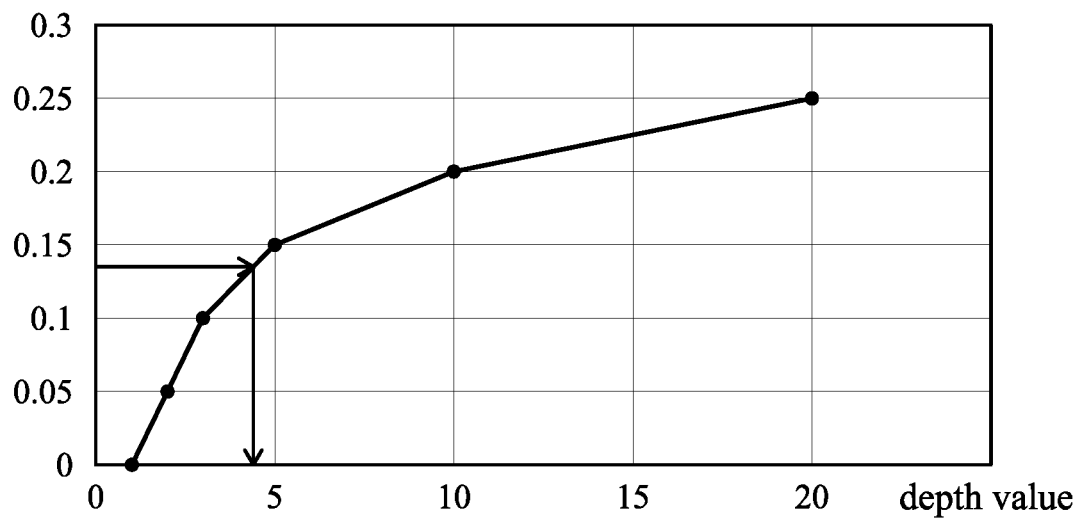
FIG. 9 exemplifies relation curve between the color weight of adjacent pixels and depth value.

Finally, in step 75, a depth value may be obtained according to the color weight W2 of adjacent pixels (obtained in step 74) based on relation between the color weight of adjacent pixels and depth value (as exemplified in relation curve between the color weight of adjacent pixels and depth value as shown in FIG. 9, which may be derived via the association table constructed in FIG. 1). The depth value represents an (object) distance between an object and a camera. Accordingly, a three-dimensional (3D) image may be generated according to the 2D image (e.g., the first image obtained in step 71/72) and the depth value obtained in step 75. For example, disparity, a left image and a right image may be generated according to the 2D image and the depth value. A stereoscopic image may be perceived when the left image and the right image are displayed at the same time. In case that the color weight W2 of adjacent pixels (in step 74) is located between two values in FIG. 9, interpolation may be applied to obtain the depth value.

FIG. 10 schematically shows imaging of a camera illustrating effect of relative position of an object to the focal point position on the imaging. In FIG. 10, positions A, B and C have the same orientation but different distances with respect to the camera, where the position A is located at a position where the focal point is located, the position B is nearer the lens than A, and the position C is farther away from the lens than A. An object being at the position A (i.e., the focal point position of the camera) may result in a sharp image on a light sensing device. The light from an object being at the position B (nearer the camera than the focal point position) will be focused behind the light sensing device, thereby resulting in a blurred image on the light sensing device. The light from an object being at the position C (farther away from the in-focus point position) will be focused in front of the light sensing device, thereby resulting in a blurred image on the light sensing device.

FIG. 11 schematically shows imaging of a camera illustrating effect of aperture size on the imaging. In FIG. 11, an object at a position A that is not the focal point position (nearer the camera than the focal point position) is imaged on the light sensing device by using different aperture sizes, that is, large aperture size L, middle aperture size M and small aperture size S, where L>M>S. Regarding the large aperture size L, the imaging range on the light sensing device is large, and the color of adjacent pixels may be therefore affected. Regarding the middle aperture size M, the imaging range on the light sensing device is smaller than that with larger aperture size L, and the color of adjacent pixels may be less affected. Regarding the small aperture size S, the imaging range on the light sensing device is further smaller, and the color of adjacent pixels may be least affected. Summarily speaking, an object being at a position other than the focal point position which is imaged by a large aperture size and small DOF may have a large imaging range to affect adjacent pixels and generate a blurred image. On the contrary, an object being at a position other than the focal point position which is imaged by a small aperture size and large DOF may have a small imaging range and generate a sharp image.

FIG. 12 schematically shows imaging of a camera illustrating effect of the position of an object with the same aperture size on the imaging. In FIG. 12, an object located at a position A (being nearer the lens than the focal point position in this example) may have an imaging range as the inner circle shows, and an object located at a position B (being nearer the lens than the position A) may have an imaging range as the outer ring shows. Summarily speaking, the farther away from (either toward or away from the lens) the focal point position the object is located, the larger the imaging range is, thereby more affecting the color of adjacent pixels and resulting in an image that is more blurred.

Although specific embodiments have been illustrated and described, it will be appreciated by those skilled in the art that various modifications may be made without departing from the scope of the present invention, which is intended to be limited solely by the appended claims.

What is claimed is:

1. An image synthesizing method, comprising:
providing an association table;
capturing a first image using a reference small aperture size;
capturing a second image using a reference large aperture size;
obtaining one or more reference color weights according to a corresponding pixel of the first image and adjacent pixels of the corresponding pixel of the first image and a corresponding pixel of the second image;
obtaining an associated distance by looking up the association table according to the one or more reference color weights;
obtaining one or more associated color weights by looking up the association table according to the associated distance and an expected aperture; and
obtaining a color value of a corresponding pixel of a synthesized image, by applying weighting to the corresponding pixel of the first image and the adjacent pixels of the corresponding pixel of the first image with the one or more associated color weights.

2. The method of claim 1, wherein the association table includes association of distance, aperture and color weight.

3. The method of claim 2, wherein the first image and the second image are captured in sequence by a single-lens imaging system.

4. The method of claim 2, wherein the first image and the second image are captured simultaneously by a dual-lens imaging system.

5. The method of claim 2, wherein a color value of the corresponding pixel of the second image is a weighted sum of the corresponding pixel of the first image and the adjacent pixels of the corresponding pixel of the first image, and wherein the one or more color weights include a color weight of the corresponding pixel of the first image and at least one of the one or more color weight of the adjacent pixels of the corresponding pixel of the first image.

6. The method of claim 5, wherein the color value of the corresponding pixel $P_{i,j}$ of the second image is the weighted sum of the corresponding pixel $p_{i,j}$ of the first image and the adjacent pixels of the corresponding pixel of the first image, wherein the relation between $P_{i,j}$ and $p_{i,j}$ is as follows:

$$P_{i,j}=p_{i,j}*N1+(p_{i-1,j}+p_{i+1,j}+p_{i,j-1}+p_{i,j+1})*N2+(p_{i-1,j-1}+p_{i-1,j+1}+p_{i+1,j-1}+p_{i+1,j+1})*N3$$

where N1 represents the color weight of the corresponding pixel of the first image, and N2 and N3 represent the color weights of the adjacent pixels of the corresponding pixel of the first image.

7. The method of claim 2, wherein the association table is constructed by the following steps:
capturing a first basis image using a basis small aperture size;
capturing a second basis image using a basis large aperture size;
constructing the association table according to a plurality of pixel positions of the first basis image and the second basis image;
capturing at least one third basis image using a third aperture being different from the basis small aperture and the basis large aperture; and
constructing the association table according to a plurality of pixel positions of the first basis image and the at least one third basis image.

8. The method of claim 7, wherein the distance is represented by a color difference or a color difference ratio between the first basis image and the second basis image.

9. The method of claim 8, wherein the color difference $\Delta(P1_{i,j}, P2_{i,j})$ between a pixel $P1_{i,j}$ of the first basis image and a corresponding pixel $P2_{i,j}$ of the second basis image is expressed as:

$$\Delta(P1_{i,j}, P2_{i,j}) = \sqrt{\left(R1_{i,j} - \frac{R2_{i,j}}{N}\right)^2 + \left(G1_{i,j} - \frac{G2_{i,j}}{N}\right)^2 + \left(B1_{i,j} - \frac{B2_{i,j}}{N}\right)^2}$$

where $R1_{i,j}$, $G1_{i,j}$ and $B1_{i,j}$ respectively represent red value, green value and blue value of the pixel of the first basis image, $R2_{i,j}$, $G2_{i,j}$ and $B2_{i,j}$ respectively represent red value, green value and blue value of the pixel $P2_{i,j}$ of the second basis image, and N represents a compensation value.

10. The method of claim 9, wherein the compensation value is defined as an aperture-area ratio of the second basis image to the first basis image.

11. The method of claim 9, wherein the compensation value is defined as a ratio of average brightness of the second basis image to average brightness of the first basis image.

12. The method of claim 8, wherein the color difference ratio is defined as a ratio of the color difference $\Delta(P1_{i,j}, P2_{i,j})$ between the corresponding pixel $P1_{i,j}$ of the first basis image and the corresponding pixel $P2_{i,j}$ of the second basis image to brightness $LP1_{i,j}$ of the corresponding pixel $P1_{i,j}$ of the first basis image, where $LP1_{i,j}$ is expressed as:

$$LP1_{i,j} = \sqrt{(R1_{i,j})^2 + (G1_{i,j})^2 + (B1_{i,j})^2}$$

where $R1_{i,j}$, $G1_{i,j}$ and $B1_{i,j}$ respectively represent red value, green value and blue value of the pixel $P1_{i,j}$ of the first basis image.

13. The method of claim 8, wherein the color difference ratio is defined as a square root of a sum of squares for color difference ratios of individual colors R, G and B as follows:

$$\text{color difference ratio} = \sqrt{\left(1 - \frac{R2_{i,j}}{NR1_{i,j}}\right)^2 + \left(1 - \frac{G2_{i,j}}{NG1_{i,j}}\right)^2 + \left(1 - \frac{B2_{i,j}}{NB1_{i,j}}\right)^2}$$

where $R1_{i,j}$, $G1_{i,j}$ and $B1_{i,j}$ respectively represent red value, green value and blue value of the pixel $P1_{i,j}$ of the first basis image, $R2_{i,j}$, $G2_{i,j}$ and $B2_{i,j}$ respectively represent red value, green value and blue value of the pixel $P2_{i,j}$ of the second basis image, and N represents a compensation value.

14. The method of claim 13, wherein the compensation value N is defined as an aperture-area ratio of the second basis image to the first basis image.

* * * * *